May 22, 1923.  C. O. BARRERA  1,456,210
AERIAL VEHICLE
Filed Aug. 17, 1922    3 Sheets-Sheet 2

Inventor
Carlos O. Barrera
By [signature]
Attorney

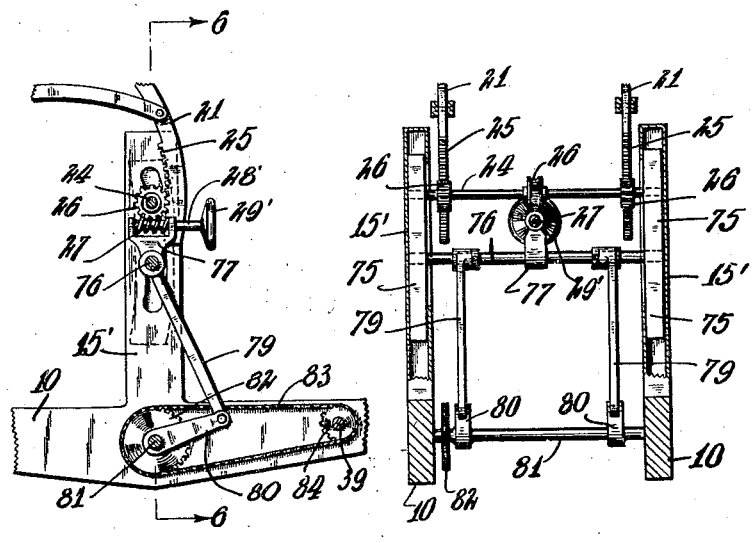

Patented May 22, 1923.

1,456,210

UNITED STATES PATENT OFFICE.

CARLOS O. BARRERA, OF TUCKAHOE, NEW YORK.

AERIAL VEHICLE.

Application filed August 17, 1922. Serial No. 582,352.

*To all whom it may concern:*

Be it known that I, CARLOS O. BARRERA, a subject of the Republic of Chile, residing at Tuckahoe, in the county of Westchester and State of New York, have invented certain new and useful Improvements in Aerial Vehicles, of which the following is a specification.

This invention relates generally to aerial vehicles of the heavier than air type, having particular reference to a novel type of aeroplane, the invention having for an object to provide a novel arrangement of sustaining planes and control devices.

For further comprehension of the invention, and of the objects and advantages thereof, reference will be had to the following description and accompanying drawings, and to the appended claims in which the various novel features of the invention are more particularly set forth.

Fig. 1 of the drawings is a perspective view of an aerial vehicle constructed according to my invention.

Fig. 5 is a fragmentary longitudinal section showing a modified control means.

Fig. 6 is a transverse sectional view taken on the line 6—6 of Fig. 5.

Figure 1:
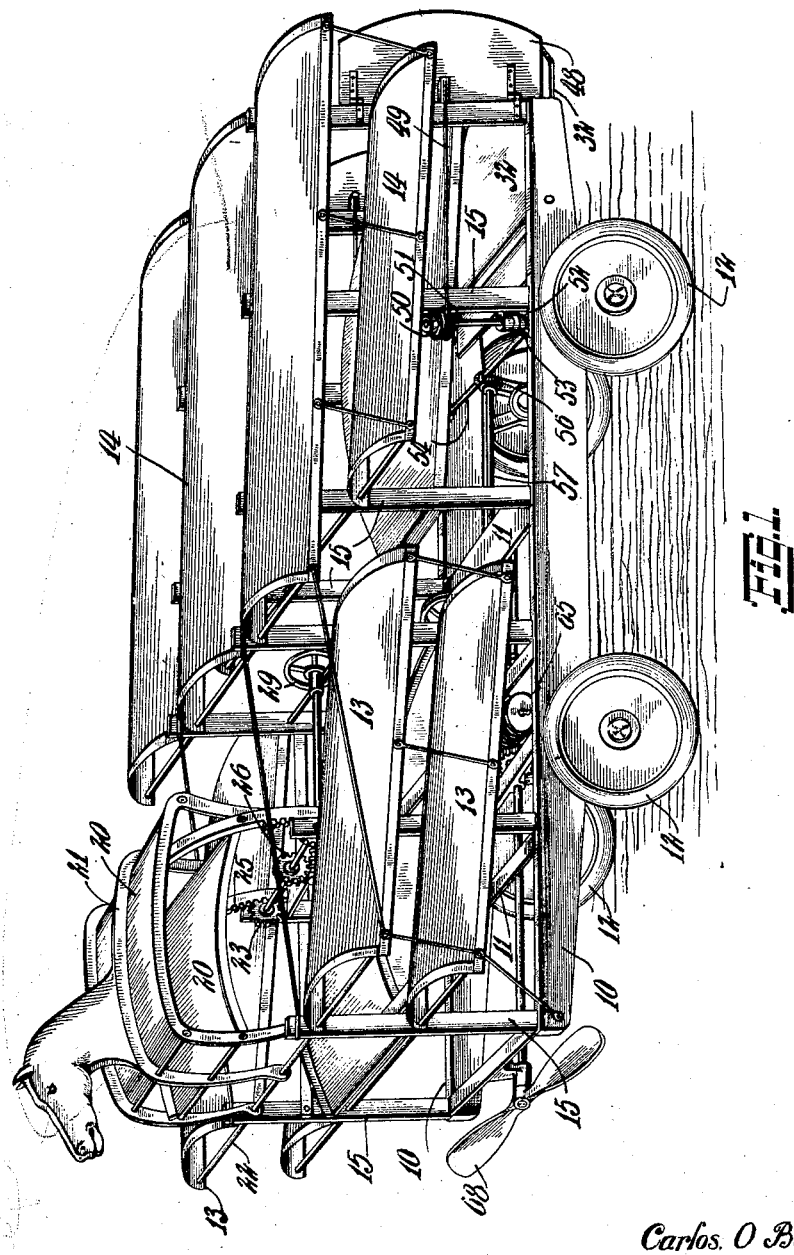
Figure 2:
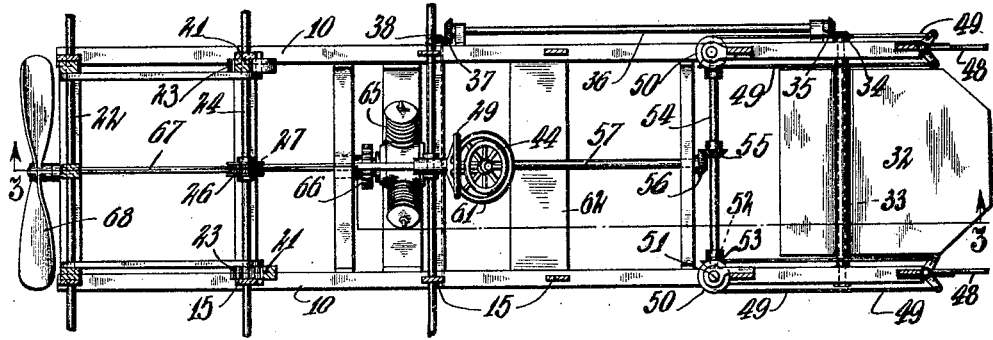
Fig. 2 is a fragmentary horizontal sectional view thereof, this view being taken on the line 2—2 of Fig. 3.
Figure 3:
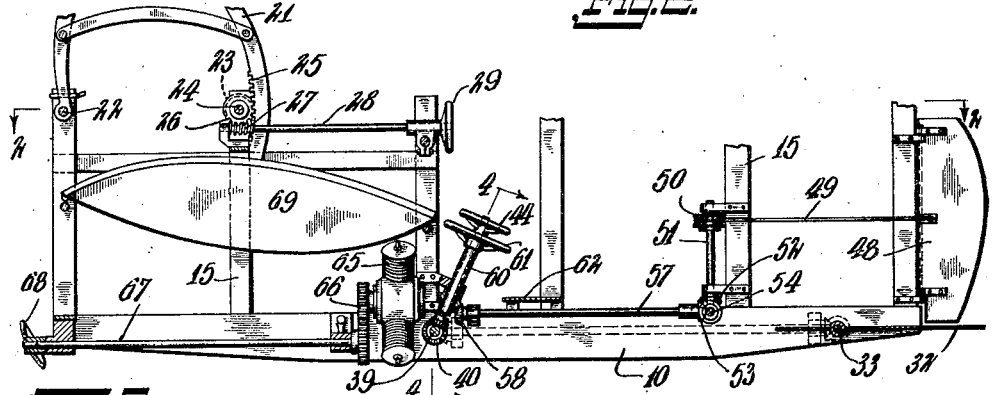
Fig. 3 is a vertical sectional view taken on the line 3—3 of Fig. 2.

As here embodied my improved aerial vehicle, or aeroplane, comprises a frame made up of main side beams 10 united by crossbars 11, the frame resting on wheels 12. The aeroplane is supported in the air by means of front planes 13 and rear planes 14 supported by struts 15. The front planes are arranged in vertically spaced pairs at the sides of the aeroplane, while the rear planes are arranged to extend completely across from side to side.

Between the spaced front planes I provide a pair of small adjustable planes 20 fixed to a U-frame 21 pivoted at its front edge to a crossbar 22, these planes being spaced one above the other. For effecting adjustment of these planes 20 a pair of gears 23 are fixed on a transverse shaft 24 supported by the struts 15, these gears meshing with rack teeth 25 formed on the frame 21 concentric to the bar 22. Upon shaft 24 is fixed also a worm gear 26 engaged by a worm pinion 27 on one end of a shaft 28 which has a handwheel 29 on its opposite end.

Figure 4:
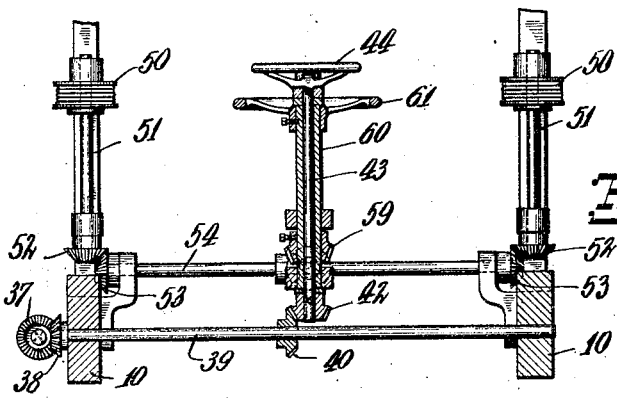
Fig. 4 is a detail transverse section taken on the line 4—4 of Fig. 3.

At the rear of the aeroplane I mount an elevator 32 which is fixed on a transverse shaft 33 extending between and supported by the frame beams 10. Upon this shaft 33 is fixed a bevel gear 34 meshing with a like gear 35 on the rear end of a longitudinal shaft 36 having a second bevel gear 37 on its forward end. Gear 37 meshes with a like gear 38 (see Fig. 4) on a second transverse shaft 39, this shaft having fixed thereon a second bevel gear 41 meshing with a bevel gear 42 on the lower end of a suitably supported steering shaft 43 which has a handwheel 44 on its upper end.

For lateral steering I provide a pair of rudders 48 operated by cords 49 looped around pulleys 50 fixed on the upper ends of vertical shafts 51 which have bevel gears 52 on their lower ends meshing with like gears 53 on the ends of another transverse shaft 54. This shaft 54 has a third bevel gear 55 thereon which meshes with a like gear 56 on the rear end of a longitudinal shaft 57 which has a second bevel gear 58 on its forward end. This gear 58 meshes with a bevel gear 59 on the lower end of a sleeve 60 freely surrounding the shaft 43 and having a handwheel 61 fixed to its upper end. These handwheels 44 and 61 are located just in front of the driver's seat 62.

The aeroplane is propelled by a motor 65 driving, through gearing 66, a longitudinal shaft 67 on which has a helical propeller 68 on its forward end. Fuel may be supplied to the motor from a tank 69 located at the front of the aeroplane.

In the modified control means shown in Figs. 5 and 6 the shaft 24 which carries the gears 23 and 26 is journaled at opposite ends in blocks 75 slidable in hollow posts 15′ which are curved concentric to the pivot rod. Extending between and fixed to the blocks 75, below the shafts 24, is a rod 76 to which is fixed a bracket 77 carrying a short shaft 28 on which the worm pinion 27 is fixed the shaft having a handwheel 29′ on its rear end. The rod 76 has connected thereto the upper ends of a pair of links 79 whose lower ends connect to arms 80 fixed on a transverse shaft 81. On shaft 81 is a sprocket wheel 82 over which is looped a chain 83 engaged also over a sprocket wheel 84 on the shaft 39 before mentioned.

As will be apparent, when handwheel 44 is turned, to move the elevator 32, the shaft 24 will be moved vertically, and the plane 20 tilted in opposition to the elevator. While the latter can be given an independent adjustment by turning the handwheel 29'.

Having thus described my invention what I claim as new and desire to protect by Letters Patent of the United States is as follows:

1. In an aeroplane, a front plane hinged on a transverse horizontal axis, a pair of slidable blocks, worm gears and pinion connections between said blocks and plane, and means for adjusting said blocks.

2. In an aeroplane, a front plane hinged on a transverse horizontal axis, a rack member on said plane concentric to the hinge axis thereof, a pair of slidable blocks movable concentric to said hinge axis, a shaft carried by said slidable blocks, gears on said shaft meshing with said rack members, a rod extending fixedly between said blocks, a bracket fixed to said rod, a worm pinion carried by said bracket and engaging said worm gear, and means for adjusting said blocks.

3. In an aeroplane, a front plane hinged on a transverse horizontal axis, a rack member on said plane concentric to the hinge axis thereof, a pair of slidable blocks movable concentric to said hinge axis, a shaft carried by said slidable blocks, gears on said shaft meshing with said rack members, a rod extending fixedly between said blocks, a bracket fixed to said rod, a worm pinion carried by said bracket and engaging said worm gear, and means for adjusting said blocks, said means including a rock shaft, a pair of arms fixed thereto, and links connecting said arms and blocks.

In testimony whereof I have affixed my signature.

CARLOS O. BARRERA.